United States Patent [19]

Olsson et al.

[11] 4,269,458
[45] May 26, 1981

[54] HYDROSTATIC BEARING, ESPECIALLY FOR A ROTATING DRUM

[75] Inventors: Curt S. Olsson, Vallentuna; Olle Widerström; Lars E. Kilian, both of Nälden, all of Sweden

[73] Assignee: Waplans Mekaniska Verkstads AB, Nälden, Sweden

[21] Appl. No.: 45,767

[22] Filed: Jun. 5, 1979

[30] Foreign Application Priority Data

Jun. 19, 1978 [SE] Sweden .............................. 7806993

[51] Int. Cl.³ ........................ F16C 32/06; F16C 39/04
[52] U.S. Cl. ......................................... 308/9; 308/73
[58] Field of Search ................. 308/9, 73, 36.3, 122, 308/DIG. 1

[56] References Cited

U.S. PATENT DOCUMENTS

| 3,146,037 | 8/1964 | Hooker | 308/9 |
| 3,610,365 | 10/1971 | Maddox et al. | 308/9 |
| 3,675,977 | 7/1972 | Arsenius et al. | 308/73 |
| 3,917,365 | 11/1975 | Jenness | 308/73 |
| 4,175,800 | 11/1979 | Chaffee et al. | 308/9 |

FOREIGN PATENT DOCUMENTS

| 2332619 | 1/1975 | Fed. Rep. of Germany | 308/9 |
| 2313591 | 12/1976 | France | 308/73 |

*Primary Examiner*—Richard R. Stearns
*Attorney, Agent, or Firm*—Cushman, Darby & Cushman

[57] ABSTRACT

The invention relates to a hydrostatic bearing for rotatable bearing of a drum, e.g. a barking drum. The bearing has a bearing box with arcuate edges adapted to the bearing surface of the drum, with a fluid inlet opening inside the edges. In grooves in the edges, sealing strips are movably laid in such a manner that the strips are pressed by the fluid pressure in the bearing box against the bearing surface of the drum when the drum is lifted by the fluid pressure.

12 Claims, 9 Drawing Figures

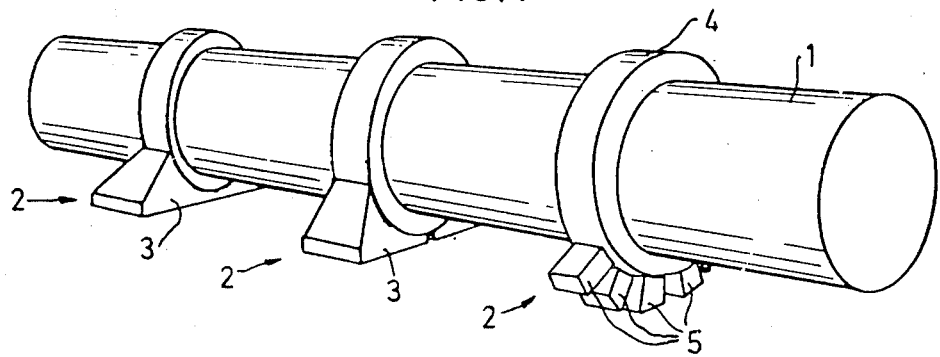
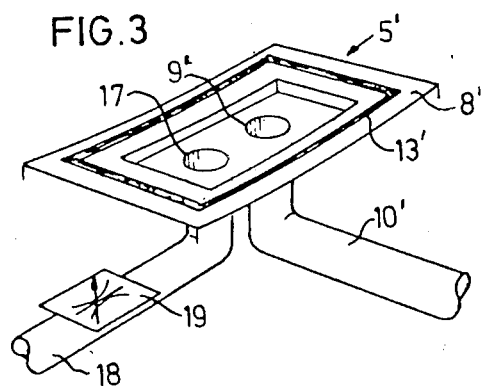
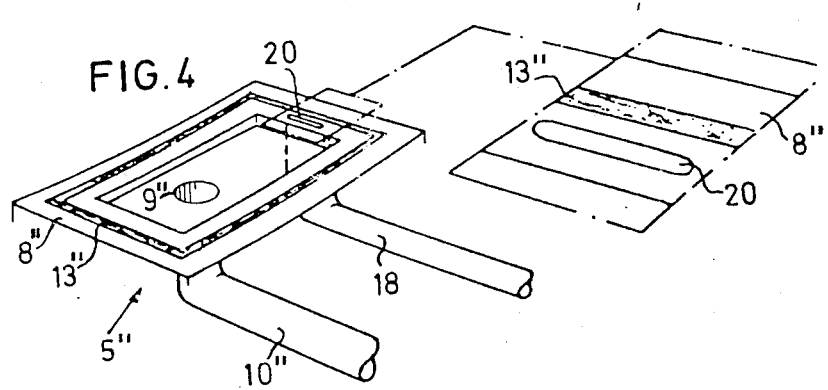

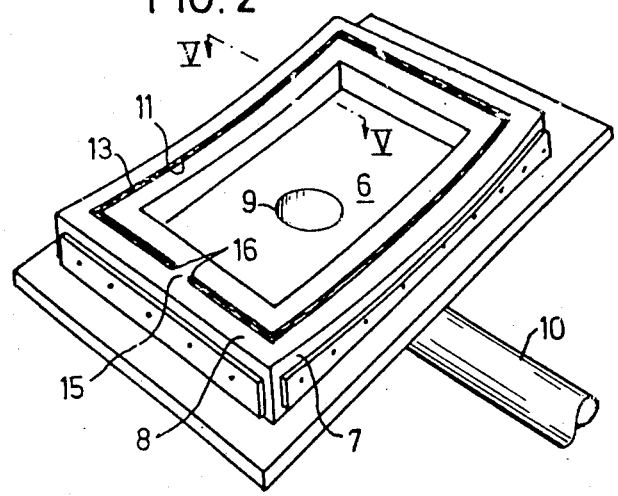
FIG. 2
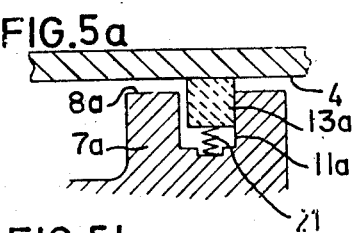
FIG. 5a
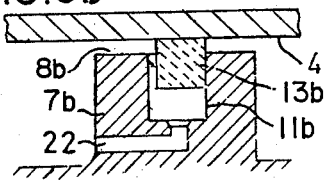
FIG. 5b
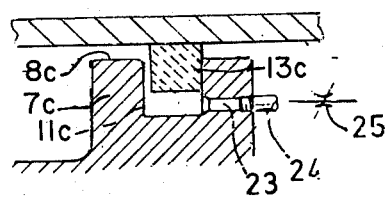
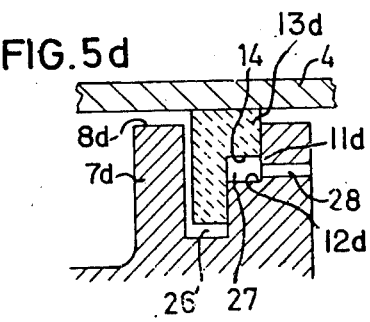
FIG. 5d
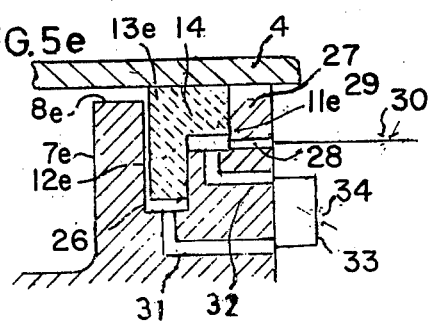
FIG. 5e

HYDROSTATIC BEARING, ESPECIALLY FOR A ROTATING DRUM

The present invention relates to a hydrostatic bearing, especially for rotatable bearing of a drum, said bearing comprising at least one bearing box limited by outer edges, with an arcuate bearing surface to fit a circular bearing surface on the drum, the bearing box having a fluid inlet opening inside the edges.

Hydrostatic bearing systems, known up to now, for bearing heavy rotating drums, e.g. barking drums, operate according to the principle that liquid is pumped into a bearing box which is limited by outer sealing surfaces. The height of lift of the bearing is determined by the amount of liquid pumped in, the viscosity and density of the liquid, the length and width of the sealing surface and the pressure requirements of the bearing. When the drum is heavy and low viscosity liquids such as water are used, the power requirements for achieving an acceptable lift height are often problematically large.

The purpose of the present invention is to achieve a hydrostatic bearing of the type described by way of introduction which has lower power requirements than previously known bearings at a given lift height and which also places lesser demands on the roundness of the bearing surface.

This is achieved according to the invention by making the bearing surface of the bearing box with at least one groove, in which at least one sealing strip is movably laid in such a manner that the prevailing fluid pressure in the bearing box presses the sealing strip against the bearing surface of the drum.

When a pressure is built up in the bearing box which is able to lift the bearing surface of the drum from the bearing surface of the box, the fluid pressure presses up the sealing strip at the same time out of the groove a corresponding amount, so that it still presses against the bearing surface of the drum. The bearing according to the invention can be made so that only minimal or no leakage occurs from the bearing box. In the latter case, the need for outer seals can be significantly reduced.

The invention will be described in more detail with reference to the accompanying drawings showing examples, in which FIG. 1 is a schematic perspective view of a drum journalled in three bearing arrangements, FIG. 2 is a schematic perspective view of an embodiment of a hydrostatic bearing according to the invention, FIG. 3 is a schematic view of a modified embodiment of the bearing according to the invention, FIG. 4 is a schematic view of another modified embodiment of the bearing according to the invention, and FIGS. 5a–e show various cross sections along the line V—V in FIG. 2, illustrating different embodiments for controlling the contact pressure of the sealing strip against the bearing surface of the drum.

The drum 1 shown in FIG. 1, which can be a barking drum for example, is journalled in three bearing arrangements 2, of which the two to the left in the figure are shown enclosed in bearing housings 3, while the one to the right is shown without bearing housing. As can be seen from FIG. 1, the bearing arrangement 2 consists of a plurality of bearing units 5 arranged in an arc and facing the race 4 of the drum. One such bearing unit is shown schematically in FIG. 2.

The bearing unit 5 in FIG. 2 forms a rectangular box with a bottom 6 and edges 7, the top side 8 of which forms the bearing surface of the bearing unit which cooperates with the race 4 of the drum. The bearing surface 8 is curved to fit the curvature of the drum race 4. In the bottom 6 there is an inlet 9 from a fluid line 10 which comes from a pump (not shown).

According to the invention, the edges 7 of the box 5 are provided with a groove 11 which opens towards the bearing surface 8. The groove 11 can either have a straight rectangular cross section (FIGS. 5a–5c) or have a step 12 (FIGS. 5d,5e), as will be described in more detail further on. A sealing strip 13 of flexible material is arranged in the groove 11. The strip can either have a rectangular cross section (FIGS. 5a–5c) or have a step 14 (FIGS. 5d,5e) and is laid loosely in the groove 11. When fluid is supplied to the box via the inlet 9, pressure is created in the bearing box, thereby also creating pressure between the bottom of the groove 11 and the underside of the strip 13. This pressure presses the strip 13 against the race 4 of the drum with a certain force. The pressure in the box is determined by the bearing load, with the lift height of the race 4 over the bearing surface 8 of the box being adjustable in various ways.

In FIG. 2, for example, the groove and strip are absent from a portion 15 of the bearing surface 8 of the box, thus making an outlet gap which is defined by the portion 15, the ends 16 of the strip 13 and the race of the drum (not shown in FIG. 2). This gap makes a variable throttle, whose area increases with the lift height, so that a certain bearing load corresponds to a certain lift height. This embodiment requires some form of external seal and return duct (not shown) for the fluid flowing through the gap.

In another embodiment of the bearing box 5', which is shown in FIG. 3, its bottom 6 is provided with an outlet 17 to which an outlet line 18 is connected. In the line 18 there is an automatically controlled throttle valve 19, which, controlled by the lift height, guides out an amount of fluid determined by pressure and lift height, according to the same principle as in the preceding example. Elements 8', 9', 10' and 13' in FIG. 3 are analogous to elements 8, 9, 10 and 13 in FIG. 1.

Finally, FIG. 4 shows another embodiment for controlling the lift height. Here, as in the preceding example, the sealing strip 13" surrounds the entire bearing box 5". An outlet opening 20 is arranged in the bearing surface 8" inside the strip. An outlet line 18 is connected to said opening. If needed, several openings can be arranged, which via a common duct or branched line run into the outlet line 18. The lift height is controlled here, as in the example in FIG. 2, by the outlet area increasing as the distance between the drum race 4 and the box bearing surface 8 increases.

In the embodiments in FIGS. 3 and 4, there is normally no leakage since the fluid outlet lies inside a sealing strip 13' or 13" which completely surrounds the bearing box 5' or 5". Thus the external sealing requirements will be small in comparison to the embodiment according to FIG. 2.

FIGS. 5a–5e illustrate different methods for maintaining and controlling the contact pressure of the sealing strip against the drum race 4.

In the embodiments in FIGS. 5a and 5b there is the same pressure in the space between the bottom of the groove 11a or 11b and the underside of the strip 13a or 13b as in the space inside the edges of the box. Since the strip has a square cross section and the pressure acts on the entire area of the strip, the strip is pressed against the race 4 with maximum contact pressure. The contact of the strip against the race can be assured with the aid of springs 21 between the strip and the groove (FIG. 5a) or with the aid of ducts 22 in the edges 7b of the box (FIG. 5b). These ducts connect the space between the bottom of the groove and the underside of the strip with the inside of the box (FIG. 5b). It is also possible to use a combination of springs 21 and ducts 22 here if it should prove to be necessary.

FIG. 5c shows an embodiment in which the strip 13c can be subjected to a pressure which is lower than the pressure in the interior of the box, in order to reduce the contact pressure in comparison to the examples described above. For this purpose, the groove space beneath the strip 13c is drained via ducts 23 in the edges 7c. The ducts 23 lead to one or more outlet lines 24 with an adjustable throttle valve 25. By varying the outlet area by means of a throttle valve one can also vary the pressure and thus the contact pressure of the strip 13c. The contact against the race 4 can be assured by means of springs (not shown) in the same manner as above. The throttle valve 25 can be alternatively replaced with a pressure limiting valve.

FIGS. 5d and 5e show modified embodiments of the groove 11d or 11e and strip 13d or 13e to achieve reduced contact pressure. The groove 11d or 11e is made with a step 12d or 12e, and the strip 13d or 13e has a step 14 to fit the groove. In this way two separate spaces 26 and 27 are formed between the groove bottom and the strip.

In the embodiment in FIG. 5d, there is the same pressure in space 26 as in the interior of the box. In the space 27, however, there is no overpressure because this space is ventilated to the atmosphere via ducts 28 in the edges 7d. Thus the fluid pressure acts on a reduced area of the strip to achieve a reduced contact pressure in comparison to the embodiment in FIG. 5a, for example.

Finally, FIG. 5e shows a further development of the embodiment in FIG. 5d, which makes possible control of the contact pressure of the strip. As before, the space 27 is provided with ducts 28, but these do not open freely to the atmosphere, but into an outlet line 29 with a throttle valve or pressure limiting valve 30. Furthermore, the groove spaces 26 and 27 communicate with each other via ducts 31 and 32 and a tube 33 with an adjustable throttle valve 34. Via said connection 31, 32 and 33, a smaller throttled fluid flow is led from the space 26 to the space 27. The pressure and thus the contact pressure of the strip is set by means of the two throttle valves 30 and 34.

What we claim is:

1. Hydrostatic bearing, especially for rotatable bearing of a drum, comprising at least one bearing box limited by outer edges, with an arcuate bearing surface to fit a circular bearing surface on the drum, the bearing box having a fluid inlet opening inside the edges, characterized in that the bearing surface of the bearing box is made with at least one groove, in which at least one sealing strip is movably laid, means being provided to establish fluid communication between the space surrounded by said edges and said groove in order to create a fluid pressure in the groove, which presses the sealing strip against the bearing surface of the drum.

2. Hydrostatic bearing according to claim 1, characterized in that the bearing box has a fluid outlet with variable throttling.

3. Hydrostatic bearing according to claim 2, characterized in that the bearing surface in at least one place is without a sealing strip, so that an outlet gap is formed which is defined by the bearing surface, two opposing sealing strip ends and a bearing surface on the drum.

4. Hydrostatic bearing according to claim 2, characterized in that the sealing strip of the bearing surface completely surrounds the bearing box which has an outlet located inside the sealing strip.

5. Hydrostatic bearing according to claim 4, characterized in that the outlet is located inside the bearing surface of the bearing box and communicates through an outlet line with a throttle valve controlled by the lift height.

6. Hydrostatic bearing according to claim 4, characterized in that the outlet is formed of an opening in the bearing surface inside the sealing strip.

7. Hydrostatic bearing according to any one of claims 1-6, characterized in that spring members are disposed between the bottom of the groove and the underside of the strip to press the upper surface of the strip against the bearing surface of the drum.

8. Hydrostatic bearing according to any one of claims 1-6, characterized in that the bottom of the groove communicates with the interior of the bearing box via ducts in the edges of the bearing box.

9. Hydrostatic bearing according to any one of claims 1-6, characterized in that the groove space under the strip is drained via ducts in the edges of the bearing box, said ducts leading to a throttled outlet.

10. Hydrostatic bearing according to any one of claims 1-6, characterized in that the underside of the strip and the bottom of the groove are made with a step, so that two mutually separate groove spaces are formed beneath the strip, one of which spaces is drained via ducts in the edges of the bearing box.

11. Hydrostatic bearing according to claim 10, characterized in that the ducts lead to an outlet with a throttle valve.

12. Hydrostatic bearing according to claim 11, characterized in that said mutually separate groove spaces communicate with each other via a throttle valve.

* * * * *